United States Patent
Kawabata et al.

(10) Patent No.: US 10,491,292 B2
(45) Date of Patent: *Nov. 26, 2019

(54) COMMUNICATION REPEATER SYSTEM AND METHOD

(71) Applicants: Kabushiki Kaisha Toshiba, Minato-ku (JP); Toshiba Infrastructure Systems & Solutions Corporation, Kawasaki-shi (JP)

(72) Inventors: Kensei Kawabata, Musashino (JP); Toshinori Doi, Inagi (JP); Kenichi Ohno, Kawasaki (JP)

(73) Assignees: Kabushiki Kaisha Toshiba, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/959,325

(22) Filed: Apr. 23, 2018

(65) Prior Publication Data

US 2018/0309511 A1 Oct. 25, 2018

(30) Foreign Application Priority Data

Apr. 24, 2017 (JP) .................... 2017-085717

(51) Int. Cl.
*H04B 7/26* (2006.01)
*H04Q 11/00* (2006.01)
*H04B 10/2575* (2013.01)

(52) U.S. Cl.
CPC ......... *H04B 7/269* (2013.01); *H04B 10/2575* (2013.01); *H04B 10/25752* (2013.01);

(Continued)

(58) Field of Classification Search
CPC .................................................. H04B 10/2575
See application file for complete search history.

(56) References Cited

U.S. PATENT DOCUMENTS

2014/0180581 A1* 6/2014 Berlin .................... G06F 17/40
701/491
2017/0150464 A1* 5/2017 Kazehaya .............. H04B 7/269

FOREIGN PATENT DOCUMENTS

| JP | 8-237731 | 9/1996 |
|----|----------|--------|
| JP | 11-8879  | 1/1999 |

(Continued)

*Primary Examiner* — Samina F Choudhry
(74) *Attorney, Agent, or Firm* — Oblon, McClelland, Maier & Neustadt, L.L.P.

(57) ABSTRACT

According to one embodiment, a communication repeater system includes a master station device, slave station devices, and radio frequency units which convert a signal from each base station system into an optical digital signal for transmission to the master station device. The base station systems establish communication by time-division duplex scheme. The communication repeater system repeats communication between a mobile communication terminal device and each base station system via a corresponding one of the slave station devices. The radio frequency units each include a detector that detects transmission/reception switching timing between the master station device and each of the radio frequency units. The slave station devices each include a setter that sets reference transmission/reception switching timing on the basis of acquired reference time information. The radio frequency units each include a corrector that corrects variation in the transmission/reception switching timing in accordance with the reference transmission/reception switching timing.

5 Claims, 7 Drawing Sheets

(52) U.S. Cl.
CPC . *H04Q 11/0062* (2013.01); *H04Q 2011/0064* (2013.01); *H04Q 2011/0088* (2013.01)

(56) References Cited

FOREIGN PATENT DOCUMENTS

| | | |
|---|---|---|
| JP | 2007-6163 | 1/2007 |
| JP | 2009-284054 | 12/2009 |

\* cited by examiner

CODES IN [ ] REPRESENT
CARRIER FREQUENCY BAND IN USE

COMMUNICATION REPEATER SYSTEM AND METHOD

This application is upon and claims the benefit of priority from Japanese Patent Application No. 2017-085717, filed Apr. 24, 2017, the entire contents of which are incorporated herein by reference.

FIELD

Embodiments described herein relate generally to a communication repeater system and method.

BACKGROUND

Radio transmission schemes, including frequency division duplexing (FDD) and time division duplexing (TOD), for mobile communication terminal devices such as mobile phones and smartphones are known. FDD employs two different frequency bands as a pair of a downlink signal and an uplink signal while TOD employs a downlink signal and an uplink signal in the same frequency band by time division.

A shared repeater system is also known in which service providers (carriers: communication service providers) share a repeater system (communication repeater system) for enabling use of mobile communication terminal devices in dead cones including indoors.

The FDD radio transmission requires a certain frequency interval (gap) between a downlink frequency band and an uplink frequency band. In recent years, the use of the TDD radio transmission scheme has been increasing due to tightness of available frequencies.

Thus, an increase in the number of devices by the TDD radio transmission scheme in the shared repeater system is expected.

In the shared repeater system adopting the TDD radio transmission, variations in time-division timing in adjacent bands among different service providers may cause mutual interference and deterioration in service quality or stop of service.

It is an object of the present invention to provide a communication repeater system and method which can reduce variations in time-division timing among different service providers and ensure improvements in service quality and continuity of service.

DETAILED DESCRIPTION

In general, according to one embodiment, a communication repeater system includes a master station device, a plurality of slave station devices, and a plurality of radio frequency units which converts a signal from each of base station systems into an optical digital signal and transmit the optical digital signal to the master station device. The base station systems establish communication by time-division duplex scheme. The communication repeater system repeats communication between a mobile communication terminal device and each of the base station system via a corresponding one of the slave station devices.

The radio frequency units each include a detector that detects each of transmission and reception switching timings between the master station device and each of the radio frequency units.

Meanwhile, the slave station devices each include a setter that sets reference transmission and reception switching timing on the basis of acquired reference time information.

The radio frequency units each include a corrector that corrects a variation in the transmission and reception switching timings in accordance with the reference transmission and reception switching timing.

Next, exemplary embodiments will be described in detail with reference to the appended drawings.

Figure 1:
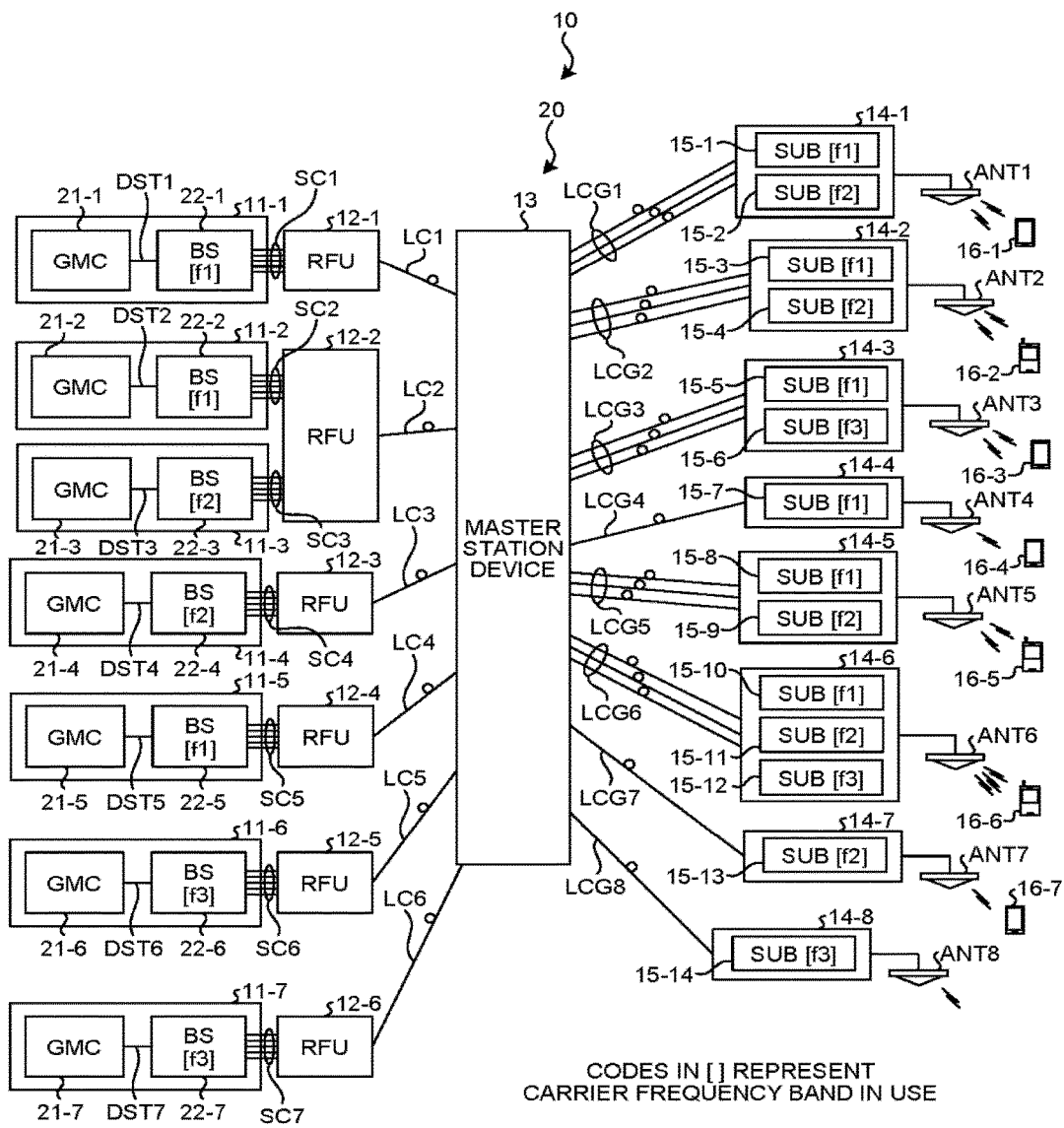
FIG. 1 is a schematic configuration block diagram of a communication repeater system according to an embodiment.

FIG. 1 is a schematic configuration block diagram of communication system including a communication repeater system according to an embodiment.

A communication system 10 includes base station systems 11-1 to 11-7, a communication repeater system 20, antennas ANT1 to ANT8, mobile communication terminal devices 16-1 to 16-7, as illustrated in FIG. 1.

The communication repeater system 20 includes radio frequency units (hereinafter referred to "RFUs") 12-1 to 12-6, a master station device 13, and slave station devices 14-1 to 14-8.

Next, a configuration of the communication system 10 will be described in detail.

First, a configuration of each of the base station systems 11-1 to 11-7 will be described.

The base station system 11-1 includes a grand master clock (GMC) unit 21-1 that receives a global navigation satellite system (GNSS) signal from a GNSS and outputs reference time data DST1 and a base station device (represented by BS in FIG. 1) 22-1 that controls communication on the basis of the reference time data DST1 via a radio frequency communication signal SC1 in a carrier frequency band f1.

The base station system 11-2 includes a grand master clock (GMC) unit 1-2 that receives a GNSS signal and outputs reference time data DST2, and a base station device 22-2 that controls communication on the basis of the reference time data DST2 via a radio frequency communication signal SC2 in the carrier frequency band f1.

The base station system 11-3 includes a grand master clock (GMC) unit 21-3 that receives a GNSS signal and outputs reference time data DST3, and a base station device 22-3 that controls communication on the basis of the reference time data DST3 via a radio frequency communication signal SC3 in a carrier frequency band f2.

The base station system 11-4 includes a grand master clock (GMC) unit 21-4 that receives a GNSS signal and outputs reference time data DST4, and a base station device 22-4 that controls communication on the basis of the reference time data DST4 via a radio frequency communication signal SC4 in the carrier frequency band f2.

The base station system 11-5 includes a grand master clock (GMC) unit 21-5 that receives a GNSS signal and outputs reference time data DST5, and a base station device 22-5 that controls communication on the basis of the reference time data DST5 via a radio frequency communication signal SC5 in the carrier frequency band f1.

The base station system 11-6 includes a grand master clock (GMC) unit 21-6 that receives a GNSS signal and outputs reference time data DST6, and a base station device 22-6 that controls communication on the basis of the reference time data DST6 via a radio frequency communication signal SC6 in a carrier frequency band f3.

The base station system 11-7 includes a grand master clock (GMC) unit 21-7 that receives a GNSS signal and outputs reference time data DST7, and a base station device 22-7 that controls communication on the basis of the reference time data DST7 via a radio frequency communication signal SC7 in the carrier frequency band f3.

Next, a configuration of the communication repeater system 20 will be described.

First, the RFUs 12-1 to 12-6 of the communication repeater system 20 will be described.

The RFU 12-1 receives radio frequency communication signals SC1 corresponding to mobile communication terminal devices from the base station system 11-1 via communication cables such as coaxial cables. Then, the RFU 12-1 multiplexes the radio frequency communication signals SC1 into a digital signal SLD1 and transmits the digital signal SLD1 to the master station device 13 via an optical cable LC1.

The RFU 12-2 receives radio frequency communication signals SC2 corresponding to mobile communication terminal devices from the base station system 11-2 via communication cables such as coaxial cables. Then, the RFU 12-2 multiplexes the radio frequency communication signals SC2 into an optical digital signal SLD2 and transmits the optical digital signal SLD2 to the master station device 13 via an optical cable LC2.

Further, the RFU 12-2 receives radio frequency communication signals SC3 corresponding to mobile communication terminal devices from the base station system 11-3 via communication cables such as coaxial cables. Then, the RFU 12-2 multiplexes the radio frequency communication signals SC3 into an optical digital signal SLD3 and transmits the optical digital signal SLD3 to the master station device 13 via the optical cable LC3.

The RFU 12-3 receives radio frequency communication signals SC4 corresponding to mobile communication terminal devices from the base station system 11-4 via communication cables such as coaxial cables. Then, the RFU 12-3 multiplexes the radio frequency communication signals SC4 into an optical digital signal SLD4 and transmits the optical digital signal SLD4 to the master station device 13 via the optical cable LC4.

The RFU 12-4 receives radio frequency communication signals SC5 corresponding to mobile communication terminal devices from the base station system 11-5 via communication cables such as coaxial cables. Then, the RFU 12-4 multiplexes the radio frequency communication signals SC5 into an optical digital signal SLD5 and transmits the optical digital signal SLD5 to the master station device 13 via the optical cable LC5.

The RFU 12-5 receives radio frequency communication signals SC6 corresponding to mobile communication terminal devices from the base station system 11-6 via communication cables such as coaxial cables. Then, the RFU 12-5 multiplexes the radio frequency communication signals SC6 into an optical digital signal SLD6 and transmits the optical digital signal SLD6 to the master station device 13 via the optical cable LC6.

The RFU 12-6 receives radio frequency communication signals SC7 corresponding to mobile communication terminal devices from the base station system 11-7 via communication cables such as coaxial cables. Then, the RFU 12-6 multiplexes the radio frequency communication signals SC7 into an optical digital signal SLD7 and transmits the optical digital signal SLD7 to the master station device 13 via the optical cable LC7.

Next, the slave station devices 14-1 to 14-8 of the communication repeater system 20 will be described.

The slave station device 14-1 includes a sub unit (represented by SUB in FIG. 1) 15-1 that communicates the mobile communication terminal device via the antenna unit ANT1 in the carrier frequency band f1 and a sub unit 15-2 that communicates with the mobile communication terminal device via the antenna unit ANT1 in the carrier frequency band f2.

The slave station device 14-2 includes a sub unit 15-3 that communicates with the mobile communication terminal device via the antenna unit ANT2 in the carrier frequency band f1 and a sub unit 15-4 that communicates with the mobile communication terminal device via the antenna unit ANT2 in the carrier frequency band f2.

The slave station device 14-3 includes a sub unit 15-5 that communicates with the mobile communication terminal device via the antenna unit ANT3 in the carrier frequency band f1 and a sub unit 15-6 that communicates with the mobile communication terminal device via the antenna unit ANT3 in the carrier frequency band f3.

The slave station device 14-4 includes a sub unit 15-7 that communicates with the mobile communication terminal device via the antenna unit ANT4 in the carrier frequency band f1.

The slave station device 14-5 includes a sub unit 15-8 that communicates with the mobile communication terminal device via the antenna unit ANT2 in the carrier frequency band f1 and a sub unit 15-9 that communicates with the mobile communication terminal device via the antenna unit ANT5 in the carrier frequency band f2.

The slave station device 14-6 includes a sub unit 15-10 that communicates with the mobile communication terminal device via the antenna unit ANT6 in the carrier frequency band f1, a sub unit 15-11 that communicates with the mobile communication terminal device via the antenna unit ANT6 in the carrier frequency band f2, and a sub unit 15-12 that communicates with the mobile communication terminal device via the antenna unit ANT6 in the carrier frequency band f3.

The slave station device 14-7 includes a sub unit 15-13 that communicates with the mobile communication terminal device via the antenna unit ANT7 in the carrier frequency band f2.

The slave station device 14-8 includes a sub unit 15-14 that communicates with the mobile communication terminal device via the antenna unit ANT7 in the carrier frequency band f3.

Next, the master station device 13 of the communication repeater system 20 will be described.

The master station device 13 corrects differences in delay among the service providers being the RFUs 12-1 to 12-6 and differences in delay among the slave station devices 14-1 to 14-8, to reduce variations in effective transmission/reception switching timing (time division duplex (TDD) timing) of the antenna units ANT1 to ANT7. This is because in the above communication repeater system 20, the antenna units ANT1 to ANT8 are disposed in the area that transmission and reception waves can interfere with each other, so that the variations in the transmission/reception switching timings among the service providers cause the transmission and reception waves to mutually interfere, making proper communication unfeasible.

In view of this, in the present embodiment, the master station device 13 detects and adjusts the variations in the transmission/reception switching timing to thereby prevent the transmission/reception waves from mutually interfering due to the variations in the transmission/reception switching timings of the antenna units ANT1 to ANT8.

This can greatly reduce the load on the slave station devices 14-1 to 14-8 from when the slave station devices 14-1 to 14-8 alone prevent mutual interference between the transmission and reception waves, leading to reducing system building costs and system operation costs.

The causes of the variations in the TDD timing will be described.

The causes of the variations in the TDD timing include (1) differences in delay among the service providers and (2) differences in delay among the slave station devices.

For example, the following five examples of differences in delay among the service providers are assumed:

(1.1) Variations in the grand master clock (GMC: reference clock) due to individual differences among the GMC units 21-1 to 21-6 of the respective service providers;

(1.2) Differences in (processing) delay due to individual differences among the base station devices 22-1 to 22-7 of the respective service providers;

(1.3) Differences in (transmission) delay due to differences in signal line lengths between the base station devices 22-1 to 22-7 of the respective service providers and the corresponding RFUs 12-1 to 12-6;

(1.4) Differences in (processing) delay due to individual differences among detector circuits of the respective RFUs 12-1 to 12-6; and (1.5) Differences in (transmission) delay due to differences in cable lengths between each of the RFUs 12-1 to 12-6 and the master station device 13.

The following two examples of differences in delay among the slave station devices are assumed:

(2.1) Differences in (transmission) delay due to a difference in cable lengths of optical cables between each of the slave station devices 14-1 to 14-8 and the master station device 13; and (2.2) Differences in (processing) delay due to individual differences among the respective slave station devices 14-1 to 14-8.

Among the causes of the variations in the TDD timing, the differences in delay among the slave station devices in the item (2) are corrected by various conventional methods. The differences in delay among the service providers will be thus described below.

From the master station device 13's point of view, the differences in delay among the service providers are considered as effective delay occurring between each of the RFUs 12-1 to 12-6 and the master station device 13. That is, delay (variation) occurring between each of the RFU 12-1 to 12-6 and the master station device 13 needs to be corrected.

When at least one of the slave station devices 14-1 to 14-8 has absolute reference timing (timing signal), different modes are assumable depending on whether the master station device 13 and the RFUs 12-1 to have absolute reference timing (timing signal).

The following two modes will be exemplified:

(1) First mode: the master station device 13 and all the RFUs 12-1 to 12-6 have absolute reference timing (timing signal); and (2) Second mode: at least one of the slave station devices 14-1 to 14-8 has absolute reference timing (timing signal).

A configuration and an operation of the communication repeater system 20 will be described below in order of the modes.

(1) The master station device 13 and all the RFUs 12-1 to 12-6 have absolute reference timing (timing signal).

In this case, it is assumed that the master station device 13 and all the RFUs 12-1 to 12-6 are provided with connected to) one of a global positioning system (GPS) receiver, a GMC unit, a terrestrial digital tuner, and an atomic clock.

Alternatively, at least one of the RFUs 12-1 to 6 or at least one of the slave station devices 14-1 to 14-8 may be provided with one of the GPS receiver, the GMC unit, the terrestrial digital tuner, and the atomic clock, and the other devices are compliant with precision time protocol (PTP) specified in IEEE 1588.

Herein, assumed that the slave station device 14-1 is connected to the GMC unit, and the master station device 13 and all of the RFUs 12-1 to 12-6 are compliant with the PTP specified in IEEE 1588, time synchronization process will be described by way of example.

The PTP is a protocol for synchronizing time among the devices connected to a local area network (LAN). In this example, the master station device 13 and the RFUs 1 to 12-6 are connected via the optical cables LC1 to LC6, and the master station device 13 and the slave station devices 14-1 to 14-8 are connected via the optical cables (group) LCG1 to LCG8, to function as a LAN as a whole.

In this case, it is necessary for the master station device 13 to synchronize time with the RFUs 12-1 to 12-6 and the base station systems 11-1 to 11-7 as a whole. The time synchronization between the RFU 12-1 and the master station device under the control of the slave station device 14-1 will be first described.

Figure 2:
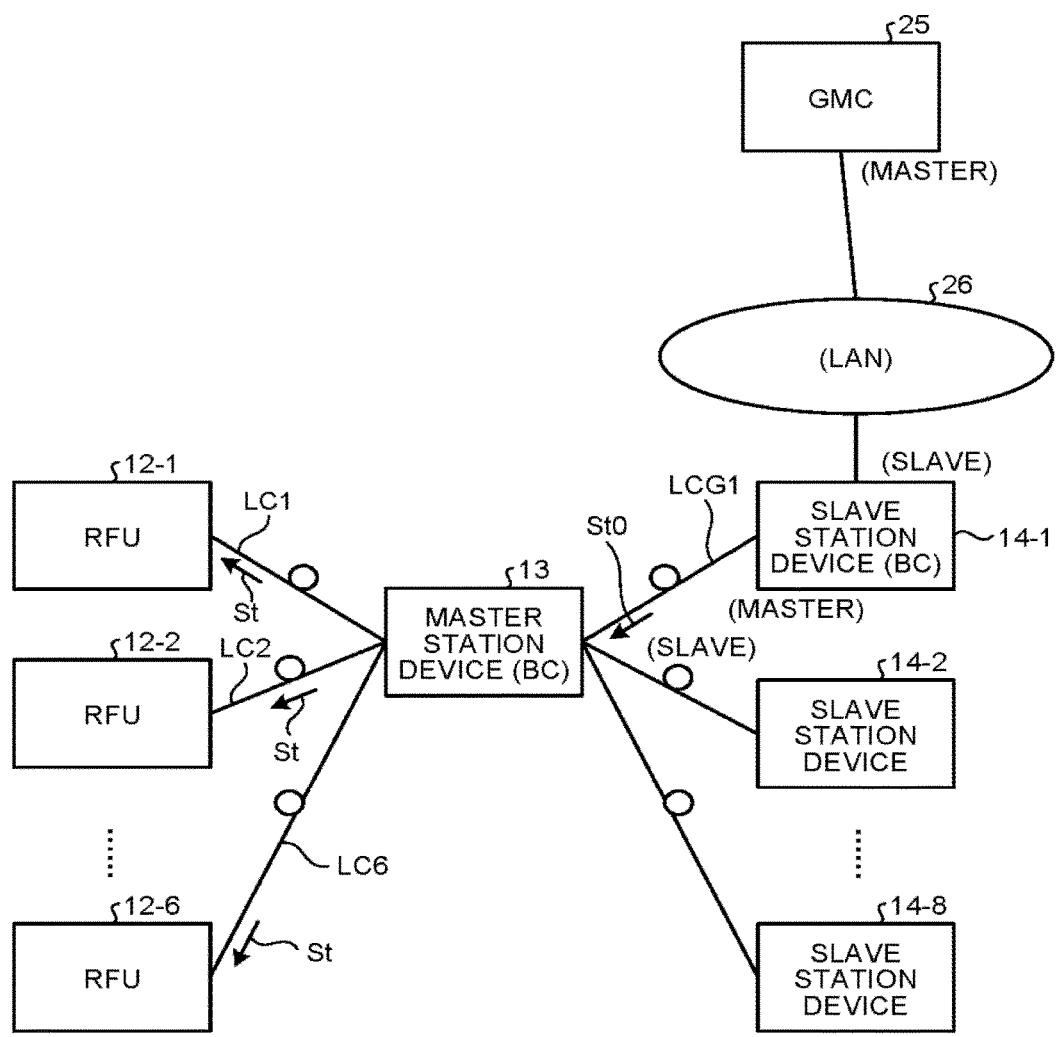
FIG. 2 is an explanatory diagram of a connection between a master station device and radio frequency units (RFUs) in a first mode.

FIG. 2 is an explanatory diagram of a connection between the master station device, and the slave station devices and the RFUs in the first mode.

To synchronize time between the master station device 13 and the RFU 12-1, the slave station device 14-1 and the master station device 13 both have a function of correcting time information transmitted from a GMC unit 25 as a boundary clock (BC) via a LAN 26 and redelivering the corrected time information to the RFU 12-1.

In the PTP, the GMC unit 25 functions as a master for the slave station device 14-1 functioning as a slave.

Further, in the PTP, the slave station device 14-1 functions as a master for the master station device 13, the master station device 13 functions as a master for the RFU 12-1, and the RFU 12-1 function as a slave.

Figure 3:
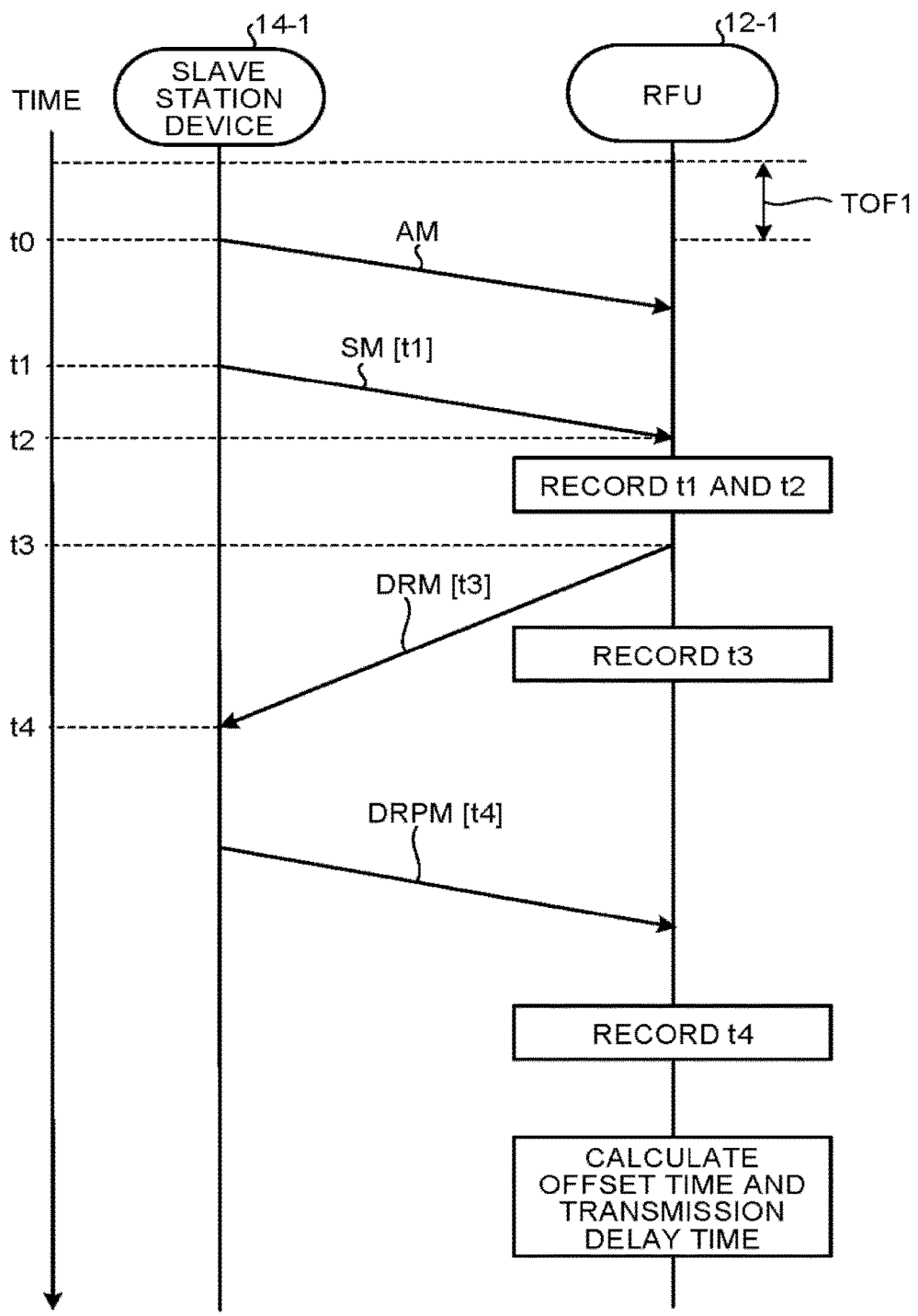
FIG. 3 is an explanatory diagram of a time synchronization process according to precision time protocol (PTP)

FIG. 3 is an explanatory diagram of a time synchronization process according to the PTP. In this case, the master station device 13 merely corrects the time information of the slave station device 14-1 being a higher-level device, and redelivers the corrected time information to the RFU 12-1 being a lower-level device, therefore, the operations between the slave station device 14-1 and the RFU 12-1 alone will be described for better understanding.

At time t0, the slave station device 14-1 transmits to the RFU 12-1 an announce message AM for notification of time synchronization accuracy information.

Thereby, the RFU 12-1 knows that it will receive the time synchronization accuracy information within a predetermined period of time after the transmission of the announce message AM.

At time t1, the slave station device 14-1 transmits a sync message SM to the RFU 12-1 as an event message.

In this case, the time t1 being the transmission time of the sync message SM recorded in the sync message SM.

At time t2, upon receiving the sync message SM, the RFU 12-1 records reception time t2.

At time t3, the RFU 12-1 transmits a delay request message DRM to the slave station device 14-1 to notify it of the receipt of the sync message SM.

In this case, the time t3 being the transmission time of the delay request message DRM is recorded in the delay request message DRM.

At time t4, upon receiving the delay request message DRM, the slave station device 14-1 records reception time t4.

Further, the slave station device 14-1 transmits a delay response message DRPM containing the reception time t4 of the delay request message DRM to the RFU 12-1.

Next, a time difference calculation method in the above situation will be described.

It is assumed that the time of a clock of the RFU 12-1 and the time of a clock of the slave station device 14-1 are offset by an offset time TOF1.

In the above example, with transmission delay time DLY1 unchanged, a time difference from the slave station device 14-1 (master) to the RFU 12-1 (slave) and a time difference from the RFU 12-1 (slave) to the slave station device 14-1 (master) satisfy the following relations.

The time difference from the slave station device 14-1 (master) to the RFU 12-1 (slave)

$$t2-t1=DLY1+TOF1 \quad (1)$$

The time difference from the RFU 12-1 (slave) to the slave station device 14-1 (master)

$$t4-t3=DLY1 TOF1 \quad (2)$$

As a result, the NFU 12-1 calculates the transmission delay time DLY1 from the sum of Formulas (1) and (2) and calculates the offset time TOF1 from the difference between Formulas (1) and (2).

That is, $$DLY1=((t2-t1)+(t4-t3))/2 \quad (3)$$

$$TOF1=((t2-t1)-(t4-t3))/2 \quad (4)$$

Similarly, the RFU 12-2 calculates an offset time TOF2 and a transmission delay time DLY2 corresponding to the slave station device 14-1. The RFU 12-3 calculates an offset time TOF3 and a transmission delay time DLY3 corresponding to the slave station device 14-1. The RFU 12-4 calculates an offset time TOF4 and a transmission delay time DLY4 corresponding to the slave station device 14-1. The RFU 12-5 calculates an offset time TOF5 and a transmission delay time DLY5 corresponding to the slave station device 14-1. The RFU 12-6 calculates an offset time TOF6 and a transmission delay time DLY6 corresponding to the slave station device 14-1.

Thus, the RFUs 12-1 to 12-6 constantly correct time on the basis of the calculated transmission delay times DLY1 to DLY6 and the offset times TOF1 to TOF6, respectively, implementing accurate time synchronization.

Next, transmission/reception switching timing setting will be described.

Figure 4:
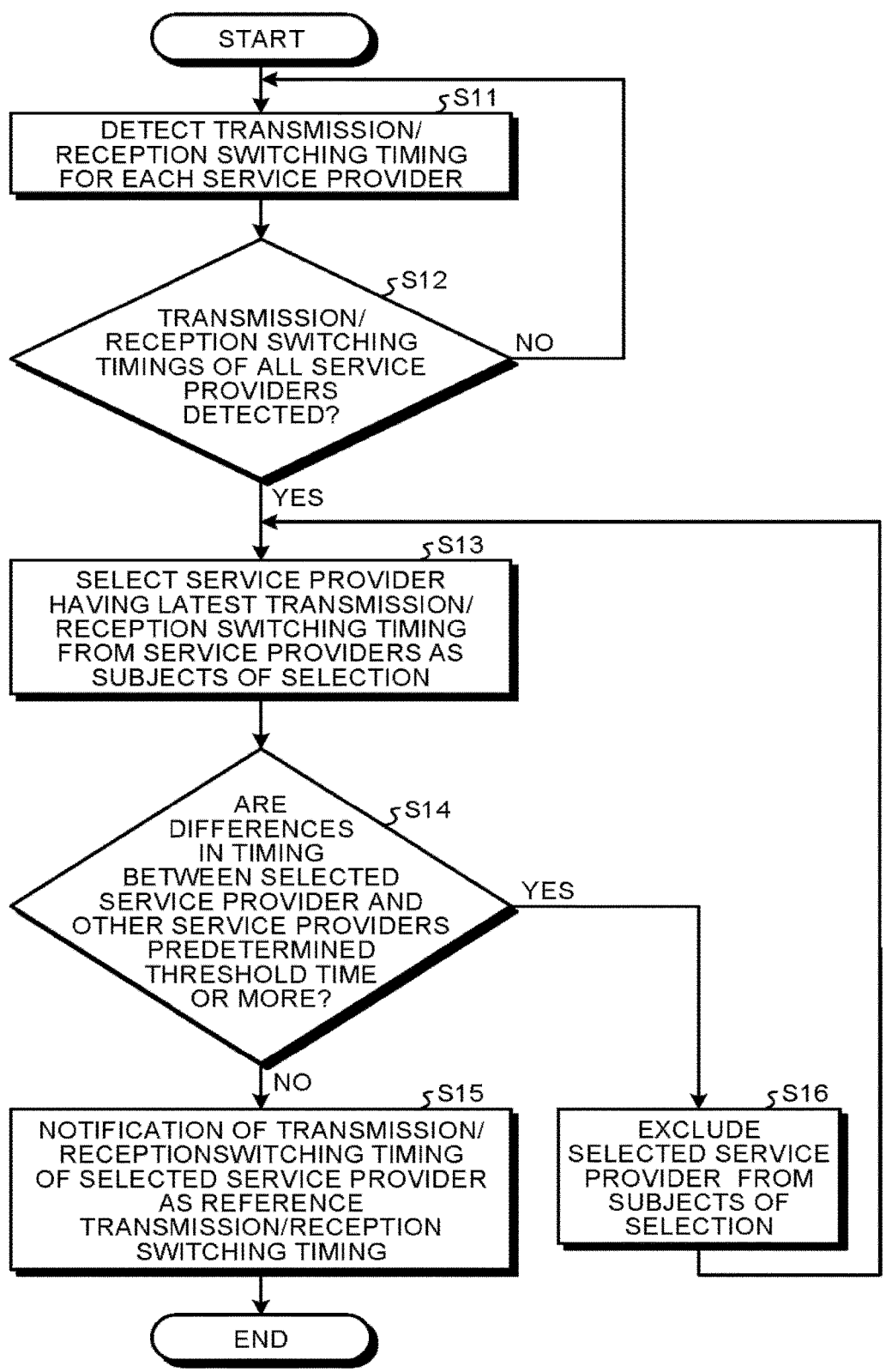
FIG. 4 is a flowchart of a transmission/reception switching timing setting process.

FIG. 4 is a flowchart of a transmission/reception switching timing setting process.

First, the slave station device 14-1 detects the transmission/reception switching timing for each service provider (for each RFU in this example) (Step S11).

Then, the slave station device 14-1 determines whether the transmission/reception switching timings corresponding to all the service providers have been detected (Step S12).

When determining in Step S12 that the transmission/reception switching timings of all the service providers have not been detected yet (Step 12; No), the slave station device 14-1 returns to Step S11 and repeats the process.

When determining in Step S12 that the transmission/reception switching timings of all the service providers have been detected (Step S12; Yes), the slave station device 14-1 selects a service provider having the latest transmission/reception switching timing among the service providers as subjects of the selection (Step S13).

Then, the slave station device 14-1 determines whether differences in the transmission/reception switching timings between the ted service provider and the other service providers are a predetermined threshold time or more (Step S14).

Herein, the predetermined threshold time is defined as a period of time set for detecting anomaly in the transmission/reception switching timing caused by a failure of a timer (clock) that the service provider concerned uses for acquiring time information. In other words, the predetermined threshold time is used for excluding unlikely transmission/reception switching timings, considering the expected accuracy of the timer.

When in Step S14 the differences in the transmission/reception switching timings between the selected service provider and the other service providers are determined to be the predetermined threshold time or more, the transmission/reception switching timing of the selected service provider cannot be adopted in terms of reliability, therefore, the slave station device 14-1 excludes the selected service provider from the subjects of the selection (Step S16), returns to Step S13 again, and subjects the remaining service providers to the above processing.

When determining in Step S14 that the differences in the transmission/reception switching timings between the selected service provider and the other service providers are less than the predetermined threshold time (Step S14; No), the slave station device 14-1 sets (while the time synchronization is established), as reference transmission/reception switching timing, the transmission/reception switching timing of the selected service provider, that is, any of the normal transmission/reception switching timings between the slave station device 14-1 and the RFUs 12-1 to 12-6 (for example, the latest transmission/reception switching timing), notifies the RFUs 12-1 to 12-6 of the reference transmission/reception switching timing, and ends the process (Step S15).

Thereby, the RFUs 12-1 to 12-6 correct the variations in the transmission/reception switching timing on the basis of the synchronized time, in accordance with the reference transmission/reception switching timing to switch transmission and reception at the reference transmission/reception switching timing.

Transmission and reception can be thus switched in synchronization with any of the transmission/reception switching timings between the slave station device 14-1 and the RFUs 12-1 to 12-6, which enables reduction in the variations in the time-division timing among the different service providers and ensures an improvement in the service quality and the continuity of the service.

(2) Only the slave station device 14-1 has absolute reference timing (timing signal).

In this case, for example, only the slave station device 14-1 as provided with (or connected to) one of the GPS receiver, the GMC unit, the terrestrial digital tuner, and the atomic clock, and all of the RFUs 12-1 to 12-6 are not compliant with the PTP specified in the IEEE 1586.

Figure 5:
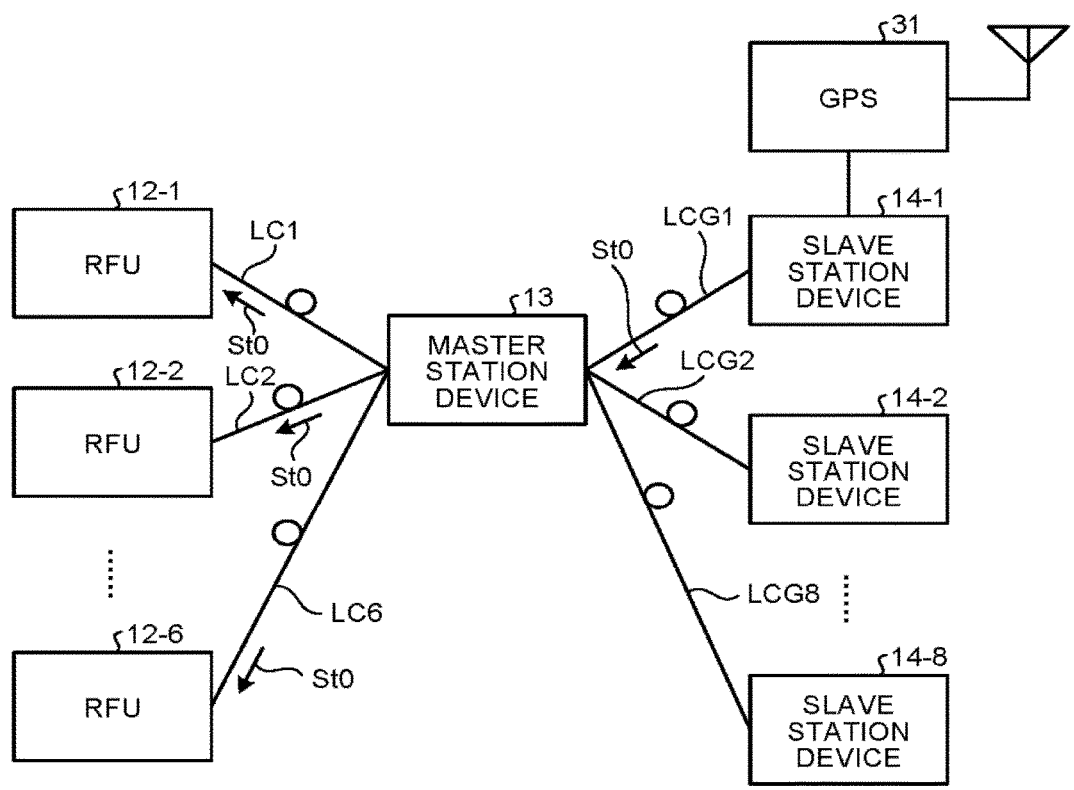
FIG. 5 is a first explanatory diagram of a connection between a master station device, and slave station devices and RFUs in a second mode.

FIG. 5 is an explanatory diagram of a connection between the master station device and the RFUs in the second mode.

In this case, the slave station device 14-1 acquires the absolute reference timing from a GPS unit 31, and concurrently transmits reference timing signals St0 to the master station device 13 and the RFUs 12 to 12-6 in association with the acquired absolute reference timing.

As a result, upon receiving the reference timing signals via the master station device 13, the RFUs 12-1 to 12-6 can correct the transmission/reception switching timing according to the transmission line lengths of the corresponding optical cable LCG1, the master station device 13, and the corresponding optical cables LC1 to LC6, and a processing delay time of the master station device 13 to attain no effective differences in delay (or differences within a predetermined allowable range) thereamong.

Further, as with the item (1), the RFUs 1 to 12-6 correct, under the established time synchronization, the variations in the transmission/reception switching timing in accordance with the reference transmission/reception switching timing to switch transmission and reception at the reference transmission/reception switching timing being the latest one of the transmission/reception switching timings between the slave station device 14-1 and the RFUs 12-1 to 12-6. This can reduce the variations in the time-division timing among the different service providers, and ensure an improvement in service quality and the continuity of the service.

Figure 6:
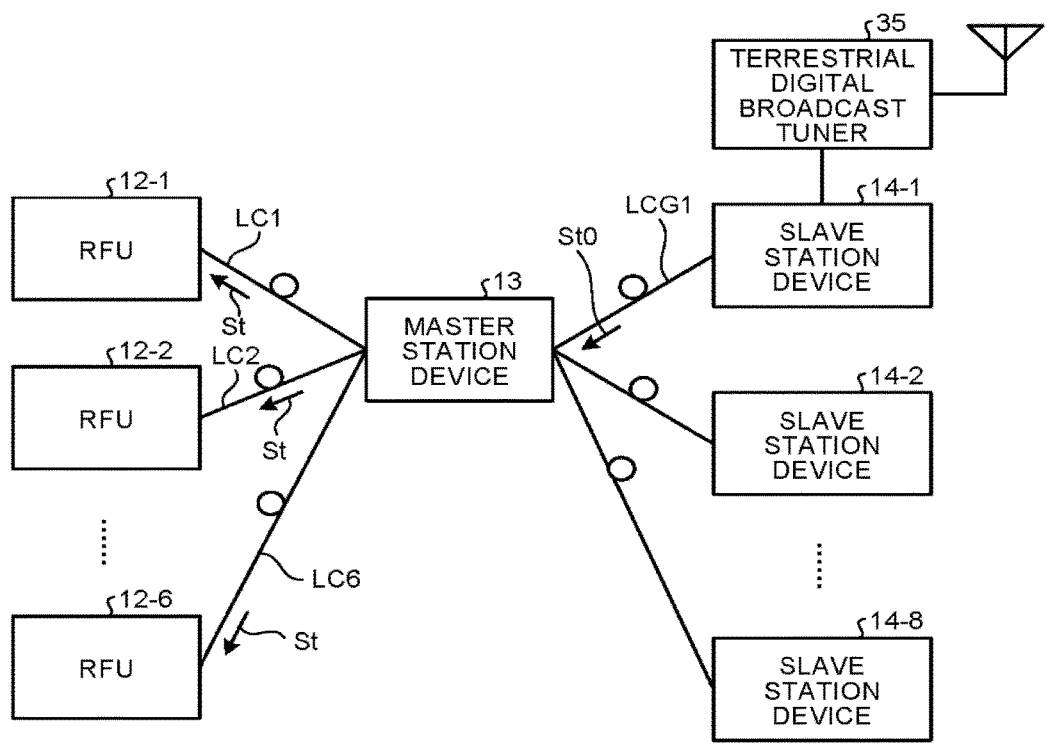
FIG. 6 is a second explanatory diagram of a connection between a master station device, and slave station devices and RFUs in the second mode.
Figure 7:
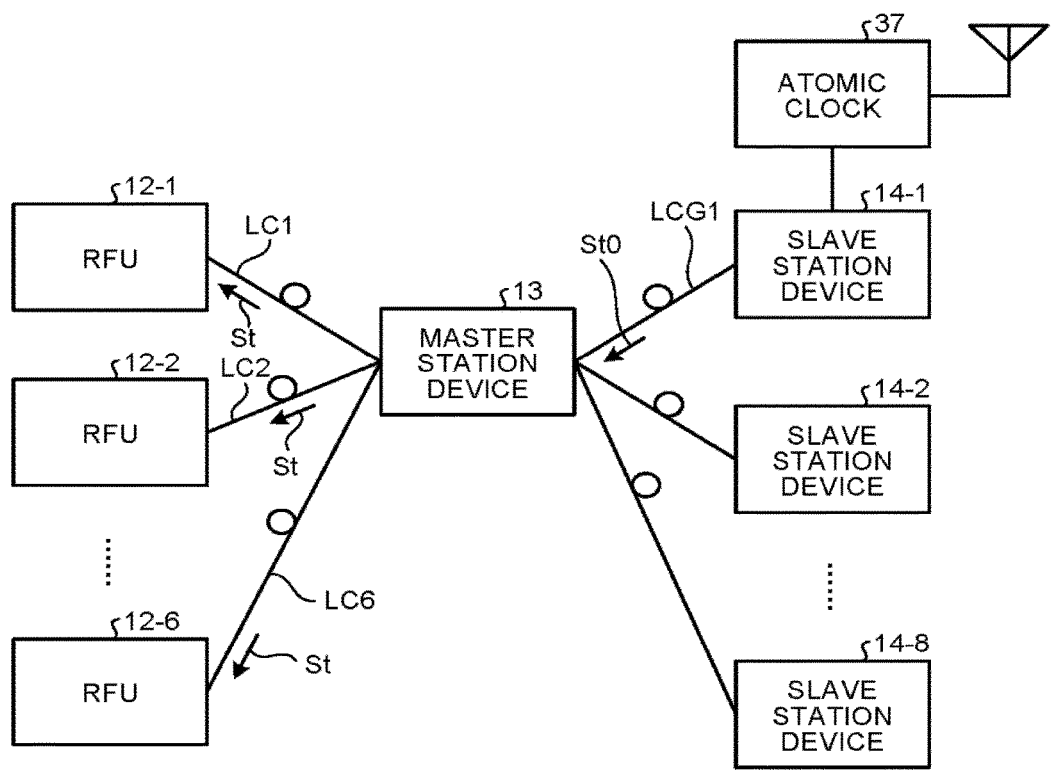
FIG. 7 is a third explanatory diagram of a connection between a master station device, and slave station devices and RFUs in the second mode.

In the above, the GMC unit is connected to the slave station device 14-1, however, the same process is feasible by the master station device to or at least one of the RFUs 12-1 to 12-6 provided with (or connected to) one of the GPS unit 31 (see FIG. 5), a terrestrial digital tuner 35 (see FIG. 6), and an atomic clock 37 (see FIG. 7) on the basis of the absolute reference timing (time information: timing signal) obtained from the device.

The master station device 13 and the slave station devices 14-1 to 14-8 of the present embodiment each include a control device such as a CPU, a storage such as a read only memory (ROM) or a RAM, and an external storage such as an HUD or a CD drive device, and have a hardware configuration of a general computer.

Programs executed by the master station device 13, the slave station devices 14-1 to 14-8, or the RFUs 12-1 to 12-6 of the present embodiment are recorded and provided in installable or executable file format on a computer readable recording medium including a CD-ROM, a DVD, or a USB memory.

The programs executed by the master station device 13, the slave station devices 14-1 to 14-8, or the RFUs 12-1 to 12-6 of the present embodiment may be stored on a computer connected to a network such as the Internet and downloaded via the network. Programs executed by the communication repeater system of the present embodiment may be provided or distributed via a network such as the Internet.

The programs of the communication repeater device of the present embodiment may be incorporated into a ROM in advance, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication repeater system comprising:
   a plurality of radio frequency units which correspond to base station systems and convert a radio signal from the corresponding base station systems into a digital signal and transmit the digital signal, the base station systems having mutually independent reference clocks for transmission and reception switching timing at which transmission and reception of an uplink signal and a downlink signal are switched by time division,
   a plurality of slave station devices, and
   a master station device that receives the digital signal from the radio frequency units and establishes communication with a mobile communication terminal device via the slave station devices, the communication repeater system that repeats communication between the mobile communication terminal device and each of the base station systems, the communication repeater system comprising:
   the radio frequency units each comprising a first processor configured to detect each of transmission and reception switching timings between the master station device and each of the radio frequency units, and to correct a variation in the transmission and reception switching timings in accordance with reference transmission and reception switching timing; and
   the slave station devices each comprising a second processor configured to set the reference transmission and reception switching timing based on acquired reference time information.

2. The communication repeater system according to claim 1, wherein
   the second processor transmits a timing signal corresponding to the reference transmission and reception switching timing to the first processor.

3. The communication repeater system according to claim 1, wherein
   the second processor acquires the reference time information from any of a grand master clock unit, a global positioning system unit, an atomic clock, and a terrestrial digital broadcast receiver.

4. The communication repeater system according to claim 3, wherein
   the first processor corrects the variation in the transmission and reception switching timings in consideration of transmission delay amounts between the slave station devices and the radio frequency units.

5. A method to be executed by a communication repeater system that comprises: a plurality of radio frequency units which correspond to base station systems and convert a radio signal from the corresponding base station systems into a digital signal and transmit the digital signal, the base station systems having mutually independent reference clocks for transmission and reception switching timing at which transmission and reception of an uplink signal and a downlink signal are switched by time division, a plurality of slave station services, and a master station device that receives the digital signal from the radio frequency units and establishes communication with a mobile communication terminal device via slave station devices, the communication repeater system that repeats communication between the mobile communication terminal device and each of the base station systems, the method comprising:
    detecting, by the radio frequency units, each of transmission and reception switching timings between the master station device and each of the radio frequency units;
    setting, by the slave station devices, reference transmission and reception switching timing based on acquired reference time information; and
    correcting, by the radio frequency units, a variation in the transmission and reception switching timings in accordance with the reference transmission and reception switching timing.

\* \* \* \* \*